United States Patent [19]

Tokuhara et al.

[11] 4,247,167
[45] Jan. 27, 1981

[54] DICHROIC MIRROR WITH AT LEAST TEN LAYERS

[75] Inventors: Mitsuhiro Tokuhara, Chigasaki; Mitsuharu Sawamura, Yokohama, both of Japan

[73] Assignee: Canon Kabushiki Kaisha, Tokyo, Japan

[21] Appl. No.: 907,818

[22] Filed: May 19, 1978

[30] Foreign Application Priority Data

May 27, 1977 [JP] Japan .................................. 52/61808
Jun. 17, 1977 [JP] Japan .................................. 52/71896

[51] Int. Cl.³ .............................................. G02B 5/28
[52] U.S. Cl. .................................................. 350/166
[58] Field of Search .............. 350/166, 164, 163, 171

[56] References Cited

U.S. PATENT DOCUMENTS

| 2,890,624 | 6/1959 | Widdop et al. | 350/166 |
| 4,047,805 | 9/1977 | Sekimura | 350/166 |

Primary Examiner—Jon W. Henry
Attorney, Agent, or Firm—Toren, McGeady and Stanger

[57] ABSTRACT

A dichroic mirror made of at least ten or more alternate high refractive index and low refractive index layers for a designed wave length expressed by λo, basic optical film thickness of the high refractive index layers are represented by $\frac{1}{4}$λo and $\frac{3}{4}$λo, while the basic optical film thickness of the low refractive index layers is represented by $\frac{1}{4}$λo. Thickness of the first layer, the second layer and the last layer as counted from a substrate, also of at least one layer of other intermediate layers are shifted from the basic optical film thickness, so that properties of the mirror are improved and a production thereof is made easier.

6 Claims, 25 Drawing Figures

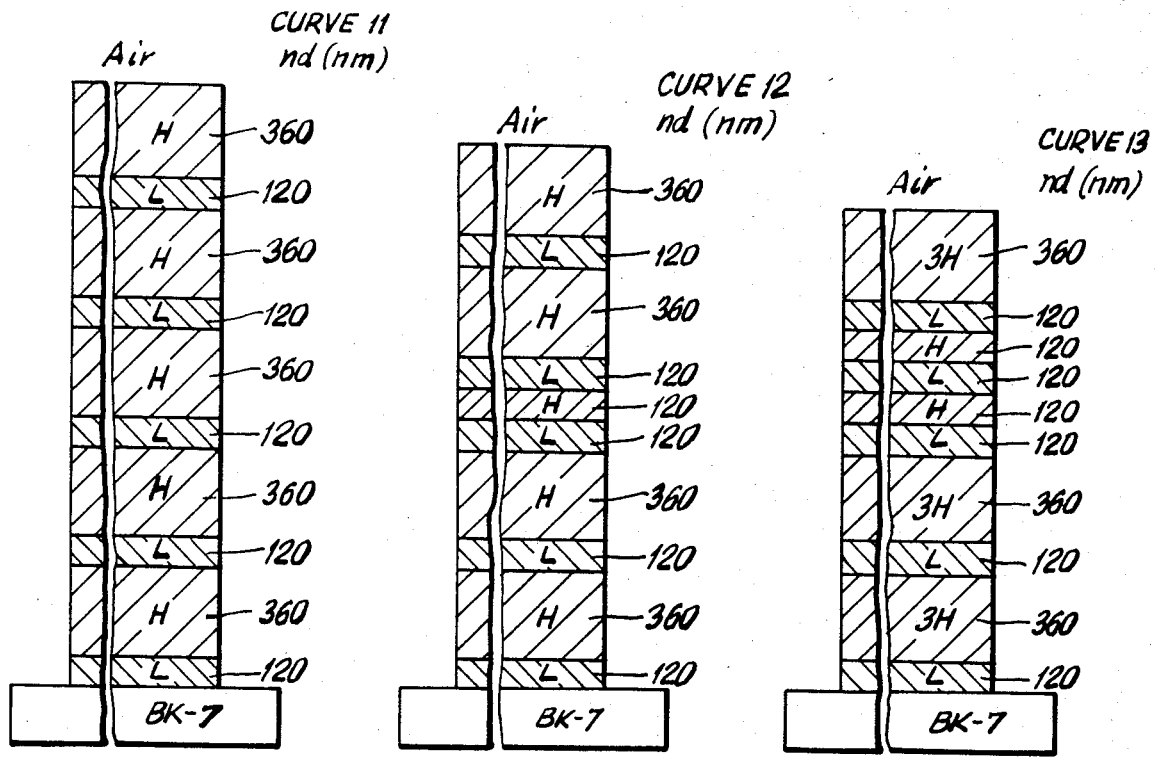
FIG.2A  FIG.2B  $n_H = 2.2$ $n_L = 1.38$ FIG.2C
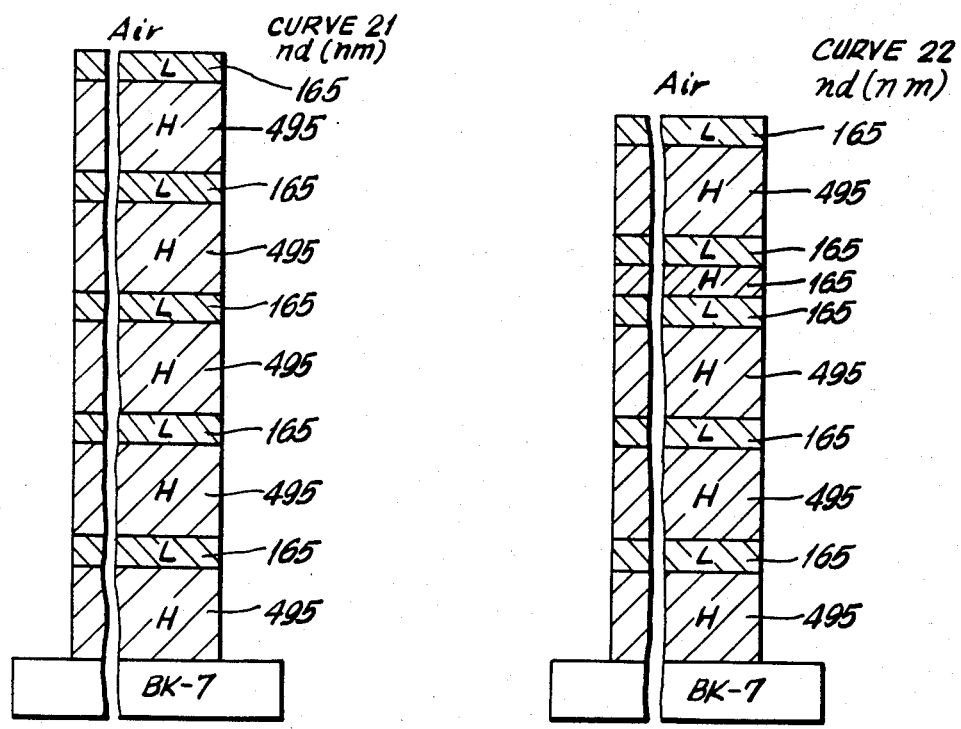
FIG.3A  FIG.3B  $n_H = 2.2$ $n_L = 1.38$

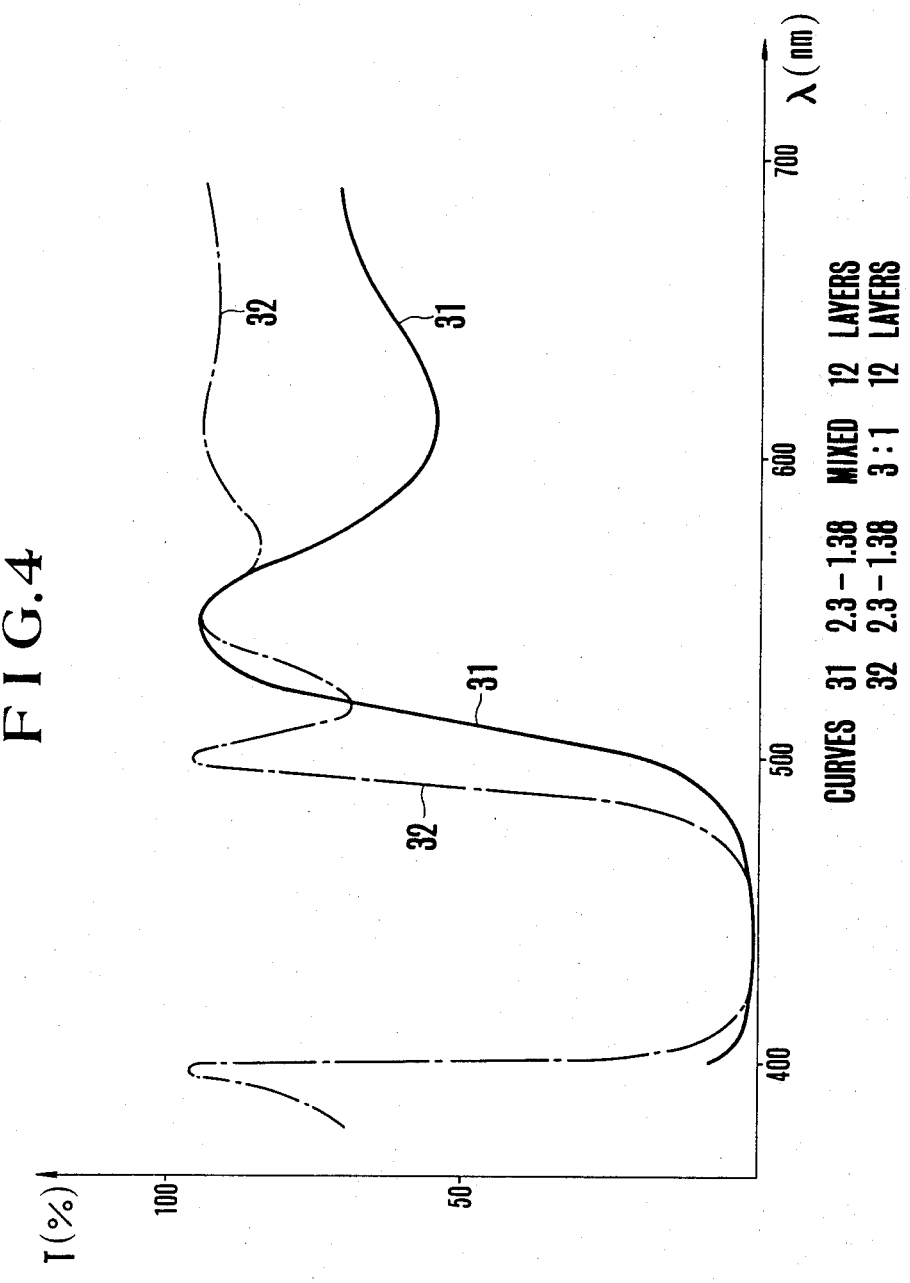

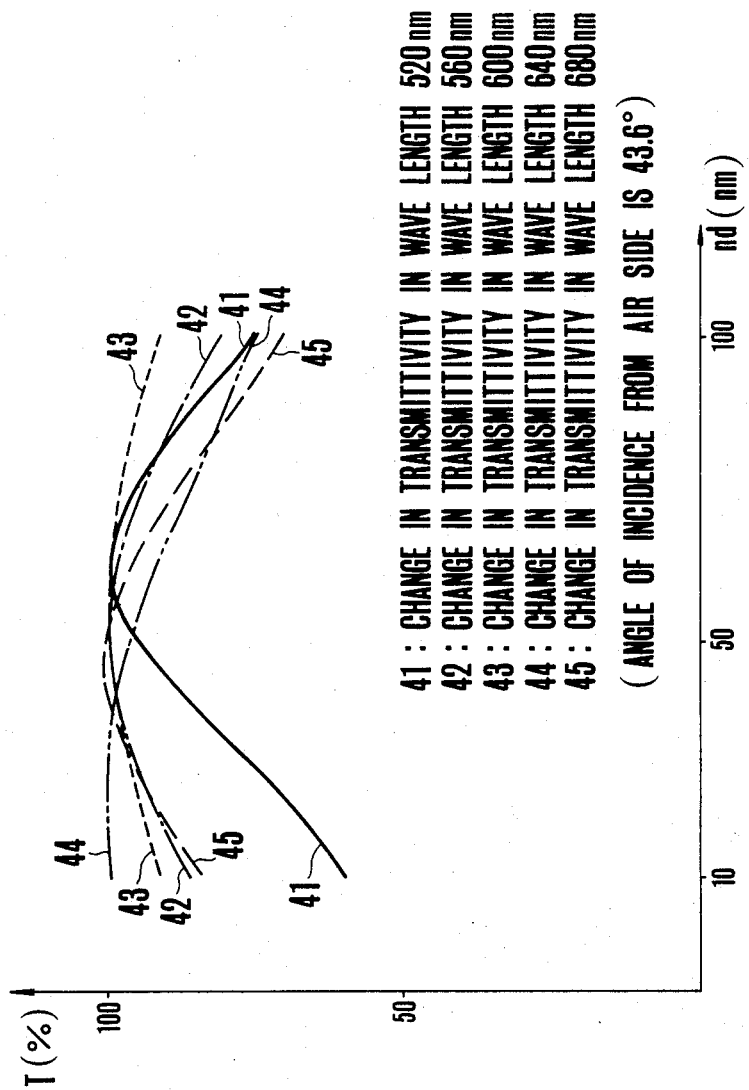

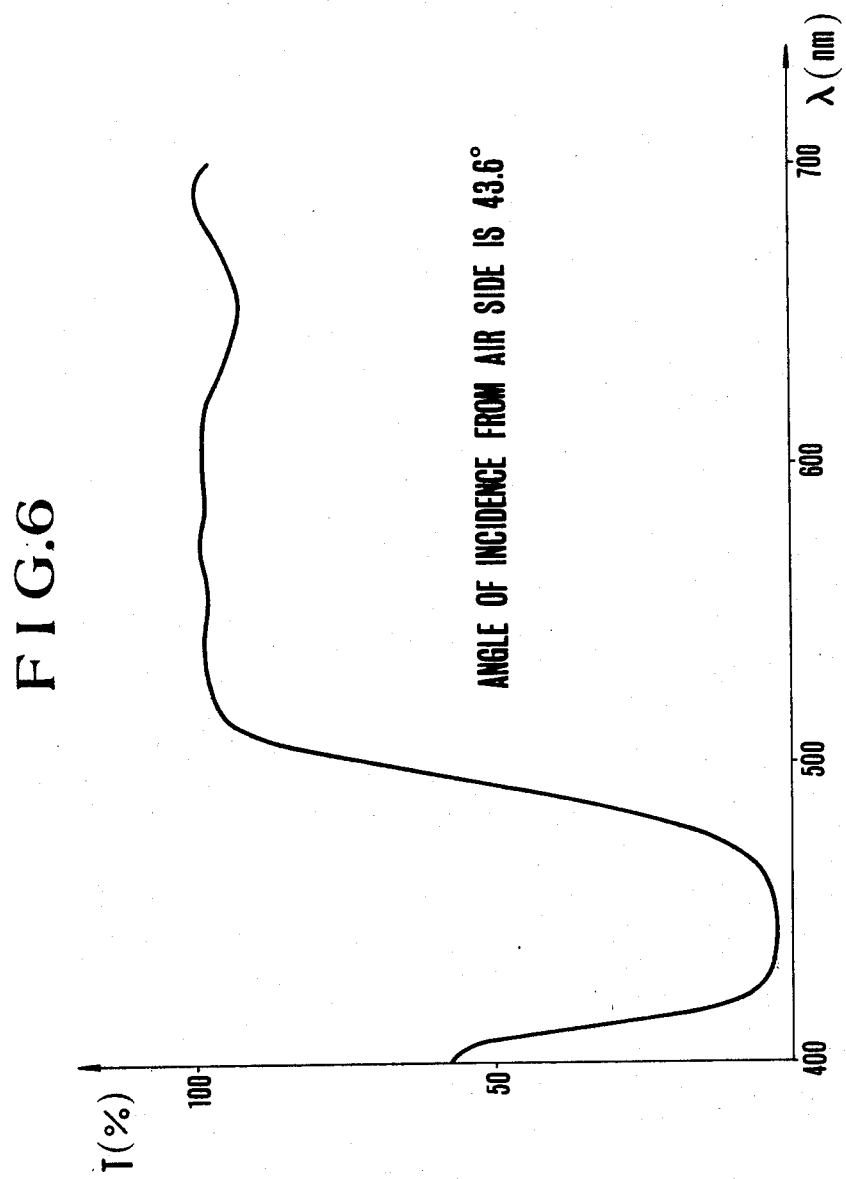

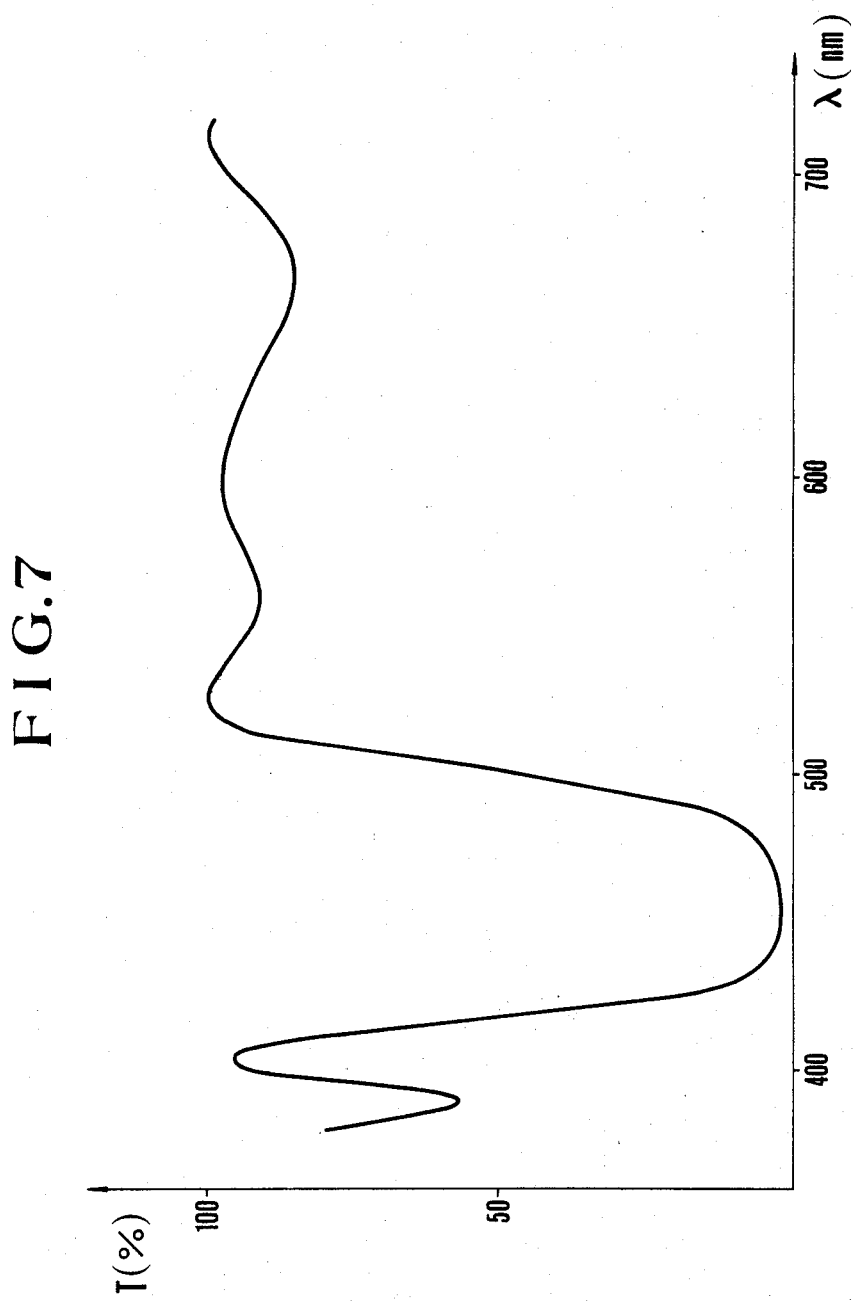

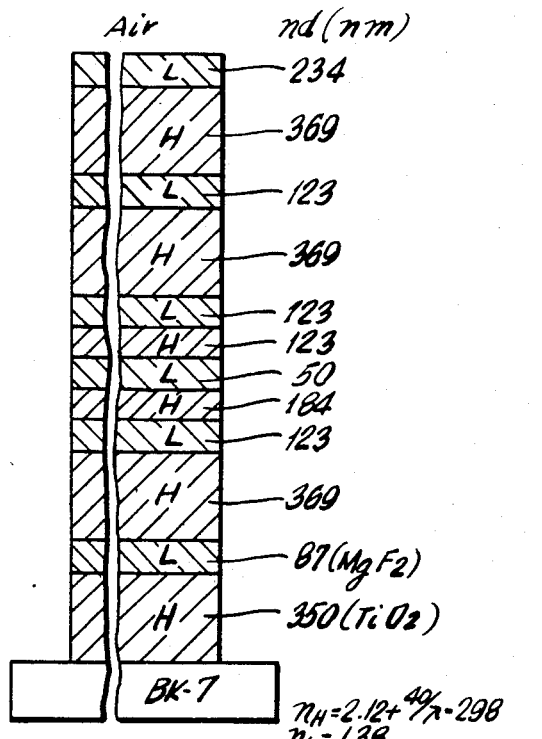
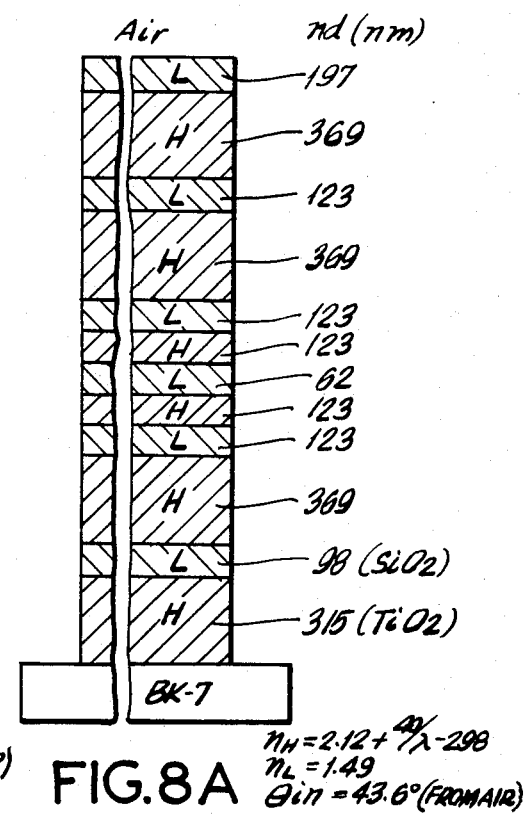
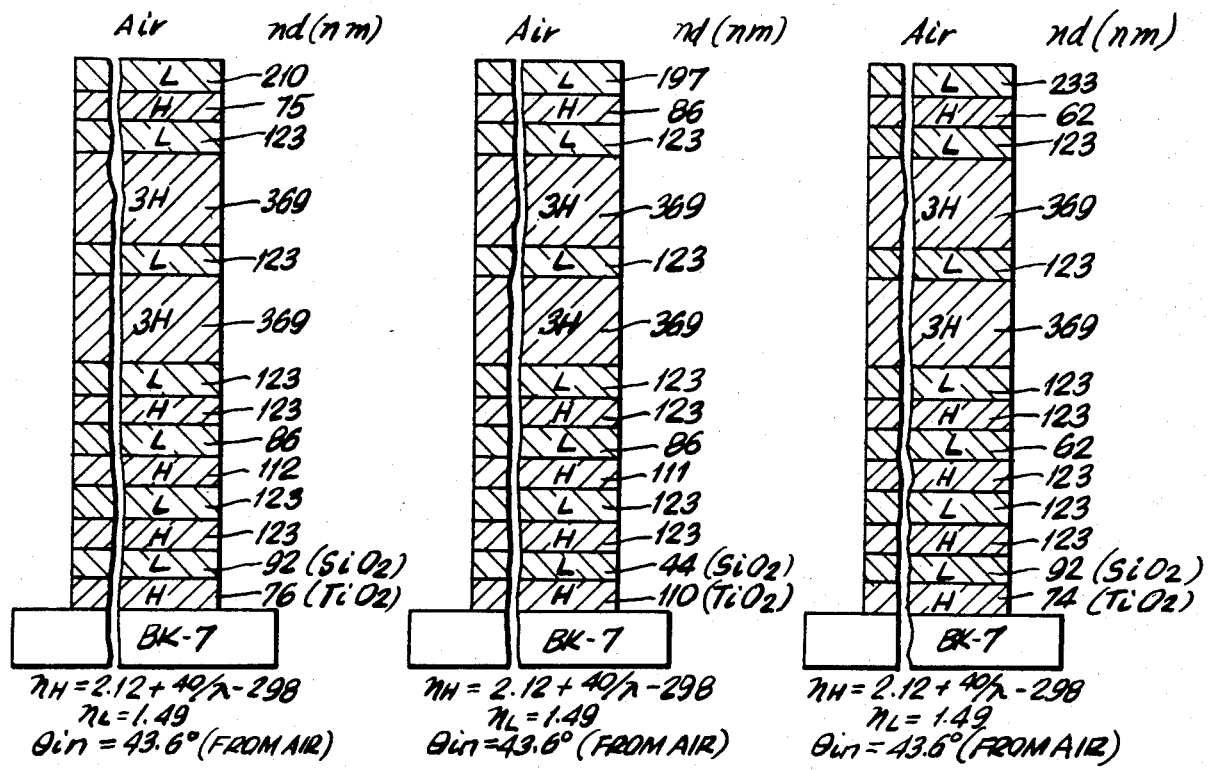
FIG.7A  FIG.8A  FIG.9A  FIG.10A  FIG.11A

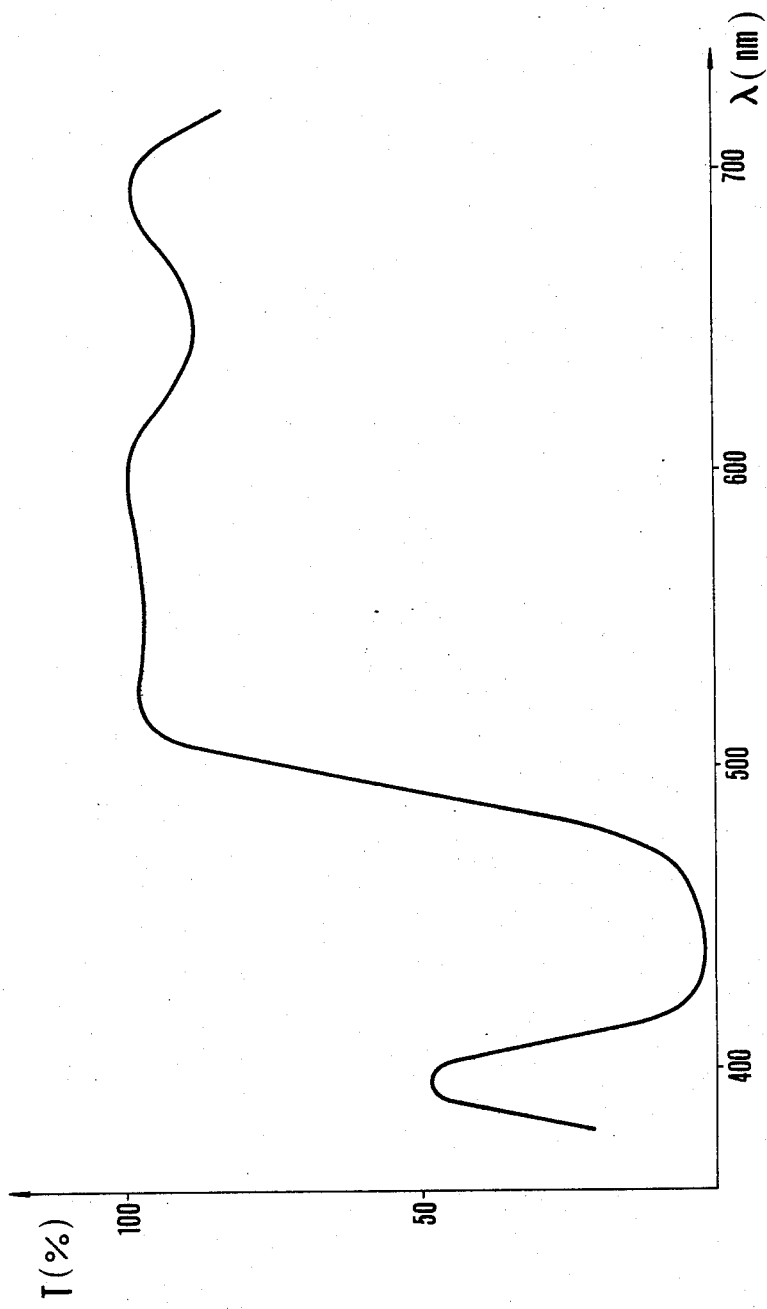

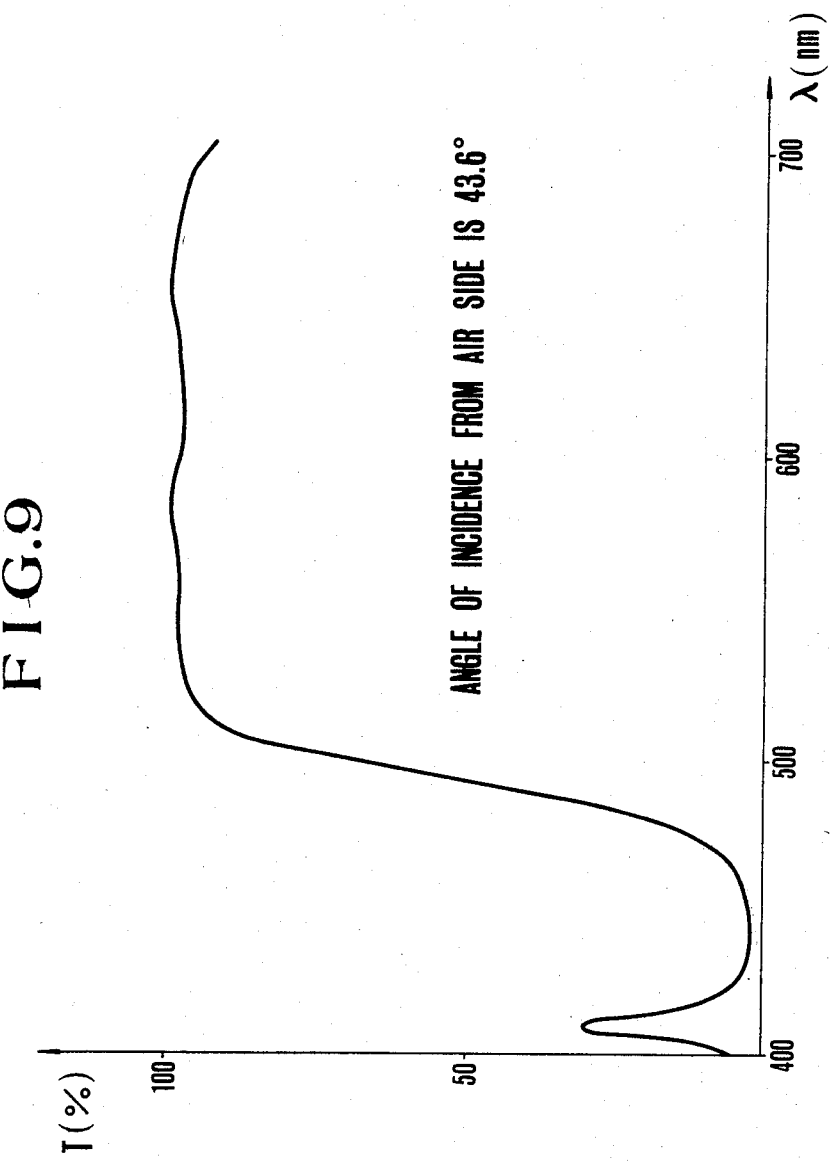

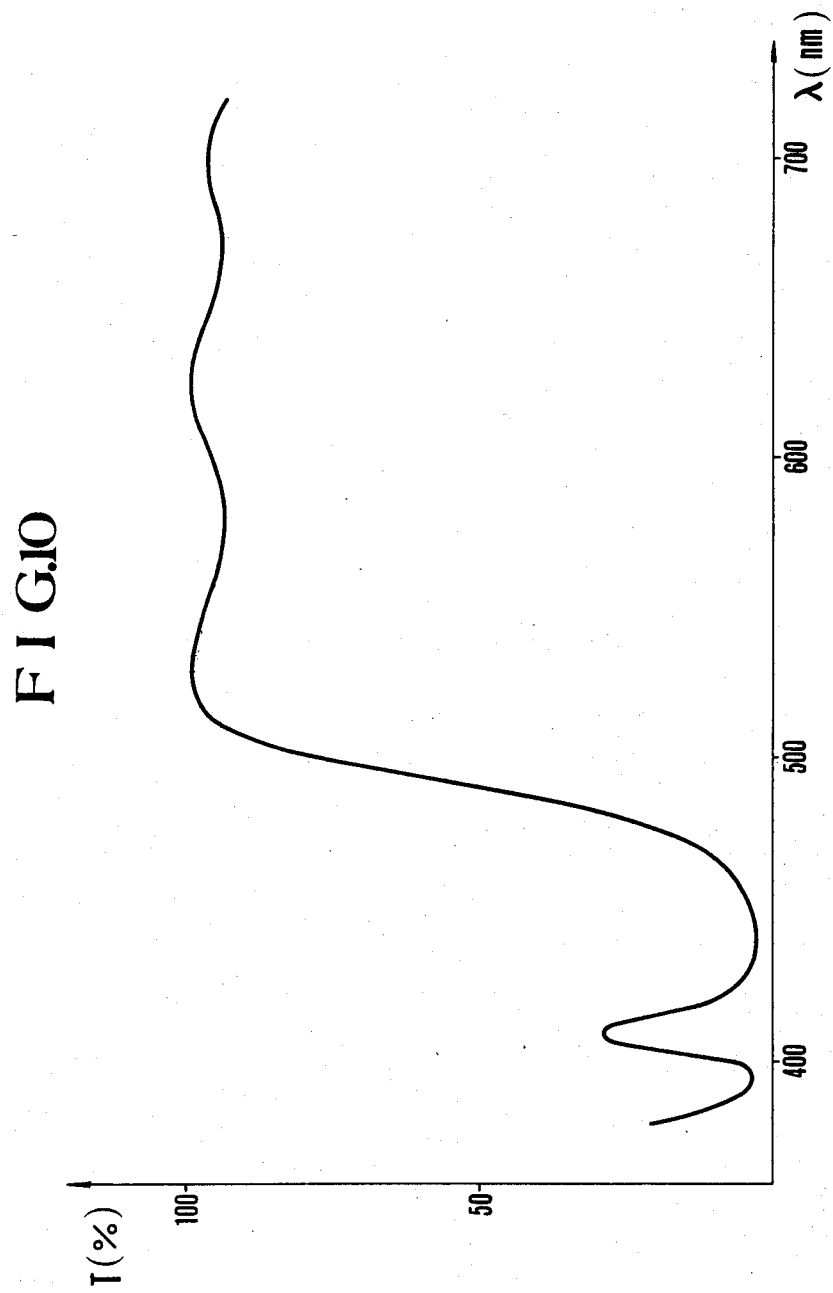

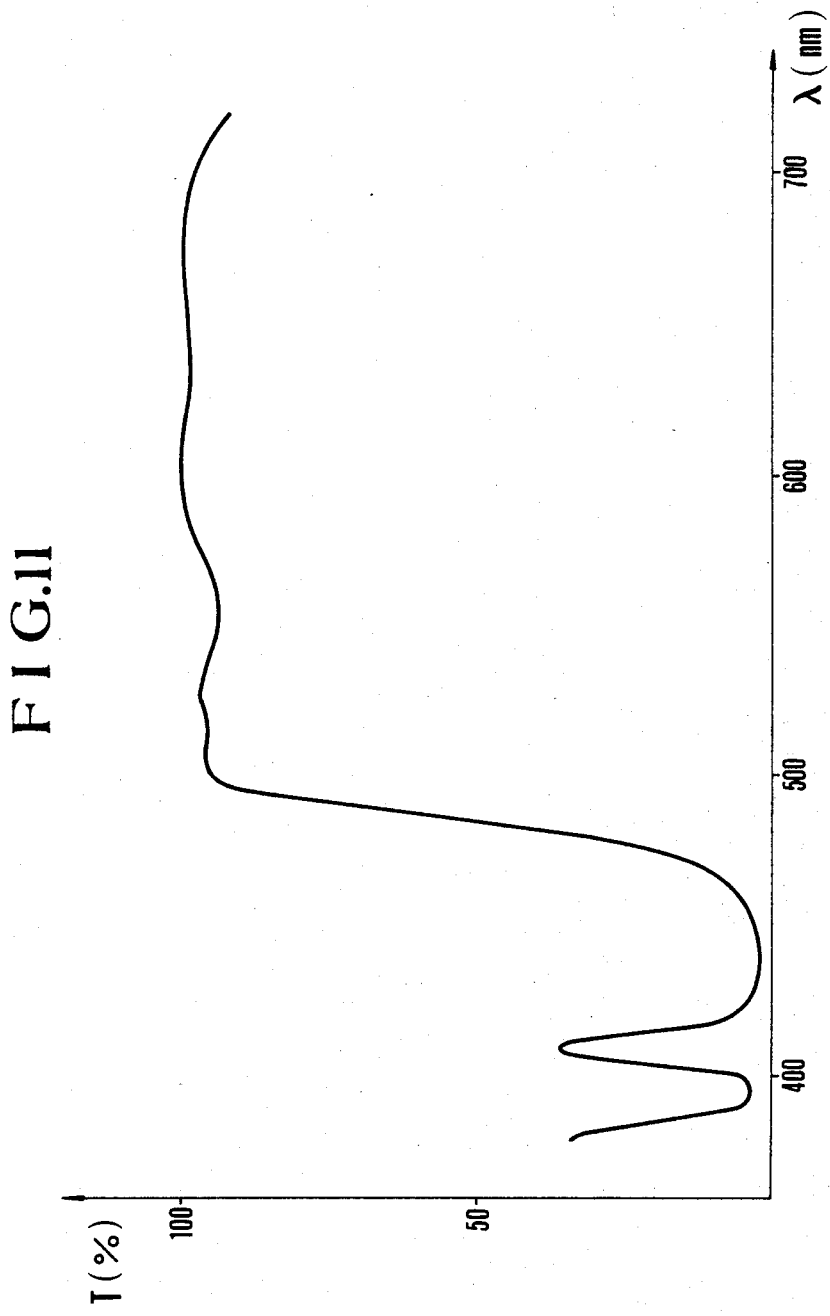

DICHROIC MIRROR WITH AT LEAST TEN LAYERS

BACKGROUND OF THE INVENTION

The present invention relates to a dichroic mirror having an appropriate half band width.

Heretofore, in a dichroic mirror consisting of alternate layers of high refractive index layers and low refractive index layers, the ratio of optical film thickness in each basic layer for the high refractive index layer and the low refractive index layer has been 1:1 or 3:1.

In a multi-layer film in which the ratio of the film optical thicknesses of high refractive index layers and low refractive index layers is 1:1, a high reflectance can be easily obtained if the ratio of refractive index is high. However, the half band width of the reflective zone becomes excessively large. Also, while an appropriate half band width can be obtained if the ratio of refractive indices is small, the number of layers increases in order to obtain a high reflectance. This makes manufacturing thereof difficult. In a multi-layer film in which the ratio of the optical film thicknesses of high refractive index films and low refractive index films is 3:1, a high ratio of refractive index is required to obtain an appropriate half band width. This is shown in FIG. 1. Here, a curve shows the transmittivity of a ten layer film in which a ratio of optical film thicknesses of high refractive index films with a refractive index of 2.3 and low refractive index films with a refractive index of 1.38 is 1:1. A curve 2 shows the transmittivity of a ten layer film in which the ratio of optical film thicknesses is 3:1 and films have same refractive indexes as those in the curve 1. A curve 3 shows the transmittivity of an eighteen (18) layer film, in which the ratio of optical film thicknesses of high refractive index films with a refractive index of 2.0 and low refractive index films with a refractive index of 1.49 is 1:1. In FIG 1, the curve 1, represents the characteristics of a mirror in which the ratio of optical film thicknesses of high refractive index films and low refractive index films is 1:1 and the ratio of refractive indices is high. The curve 1 has a large half band width. If one wishes to provide properties with an appropriate half band width such as in the curve 3, the number of layers will become as high as 18. Also when the ratio of optical film thicknesses is 3:1, the half band width becomes small as shown by the curve 2.

The relationship between a combination of refractive indices in an evaporation film and the half band width of the reflective zone is as follows. When a ratio of the wave-number to a reference wave length is represented by g, in a mirror having an optical film thickness ratio 1:1 and a sufficiently large number of layers, one half, $\Delta g$, of the half band width of the mirror film thickness ratio of 1:1 when a number of layers is sufficiently large, is expressed by:

$$\Delta g = \frac{2}{\pi} \sin^{-1} | \frac{nH - nL}{nH + nL} |$$

wherein nH is a high refractive index and nL is a low refractive index.

For a film having an optical film thickness ratio of 3:1, the value $\Delta g$ is expressed by:

$$\Delta g = \frac{2}{\pi} \sin^{-1} \frac{1}{2} | \frac{nH - nL}{nH + nL} |$$

Relationships between refractive indexes of films of $TiO_2$ (2.3 to 2.4), $ZrO_2$ (2.0), $SiO_2$ (1.49), $MgF_2$ (1.38) which are frequently used nowadays and their half band widths are shown in Table 1, using both of the above formulae. A reference wave length of a reflective zone is made 440 nm, here.

TABLE 1

| | nH | nL | Half band width for a reference wave length of 440 nm |
|---|---|---|---|
| Ratio of 1:1 | 2.3 | 1.38 | 145 |
| | 2.0 | 1.49 | 83 |
| | 2.4 | 1.38 | 76 |
| Ratio of 3:1 | 2.3 | 1.38 | 71 |
| | 2.3 | 1.49 | 60 |

Films with an optical film thickness ratio of 1:1 can have a half band width of 80 nm or above when the ratio of refractive indexes is small such as a high refractive index of 2.0 and a low refractive index of 1.49. However, the number of layers reaches 20 layers or more in order to achieve a high reflectance. Thus, such a film is difficult to manufacture. Also, films having an optical film thickness ratio of 3:1 require films with high refractive indexes of 2.4 or above in order to secure a half band width of 80 nm or above. However a film with high refractive index contains a high dispersion at short wave lengths. Hence its half band width becomes narrow, thus it is difficult to obtain a half band width of 80 nm or above.

SUMMARY OF THE INVENTION

It is an object of the present invention to improve the half band width of such a dichroic mirror, that is, to provide a dichroic mirror with an appropriate half band width without increasing the number of layers.

It is another object of the present invention to effectively remove ripples in the above mentioned dichroic mirror.

A dichroic mirror according to the present invention comprises alternate high refractive index layers and low refractive index layers, wherein, with a reference (designed) wave length λo, layers having optical film thicknesses of λo/4 and 3λo/4 are mixedly provided in basic layers of high refractive index layers, while layers with optical film thickness of λo/4 are provided in basic layers of low refractive index layers, thus a desired half band width can be obtained without increasing the number of layers.

Further, the present invention provides a dichroic mirror having at least 10 or more of high refractive index basic layers and low refractive index basic layers laid up alternately, in which, when a reference wave length is represented by λo, the optical film thicknesses of basic layers with a high refractive index are ¼λo and ¾λo, and the optical film thicknesses of basic layers with low refractive index is ¼λo, wherein the first layer, the second layer and the last layer as counted from a substrate as well as at least one layer of other intermediate layers are made as non-integer adjusting layers, and optical film thickness of these layers are shifted from the above mentioned optical film thicknesses of the basic layer for effectively removing ripples.

Ripples in a dichroic mirror according to the present invention are effectively removed by non-integer adjusting layers provided at intermediate layer or layers, as positions of the high refractive index layers with $\frac{1}{4}\lambda o$ thickness and of the high refractive index layers with $\frac{3}{4}\lambda o$ thickness will be limited when the number of layers of the dichroic mirror is determined.

BRIEF DESCRIPTION OF THE DRAWINGS

FIGS. 2A, 2B and 2C are partial sections of the mirrors having the properties in FIG. 2 and embodying features of the invention.

FIGS. 3A and 3B are partial sections of mirrors embodying the properties of FIG. 3 and features of the invention.

FIG. 4 is a diagram explaining the relationships between half band width and ripples of a dichroic mirror according to the present invention.

FIG. 5 is a diagram showing an effect of restraining ripples by a non-integer adjusting layer provided at intermediate layers in a dichroic mirror according to the present invention.

FIG. 6, FIG. 7 and FIG. 8 are diagrams showing examples of blue-reflecting dichroic mirror with 12-layer structure according to the present invention.

FIGS. 6A, 7A, and 8A are partial sections of mirrors having the characteristics shown in FIG. 6 and embodying features of the invention.

FIG. 9, FIG. 10 and FIG. 11 are diagrams showing examples of blue-reflecting dichroic mirror with 14-layer structure according to the present invention.

FIGS. 9A, 10A, and 11A are partial sections of mirrors having the characteristics shown in FIGS. 9, 10, and 11, and embodying features of the invention.

DESCRIPTION OF THE PREFERRED EMBODIMENT

Figure 1:
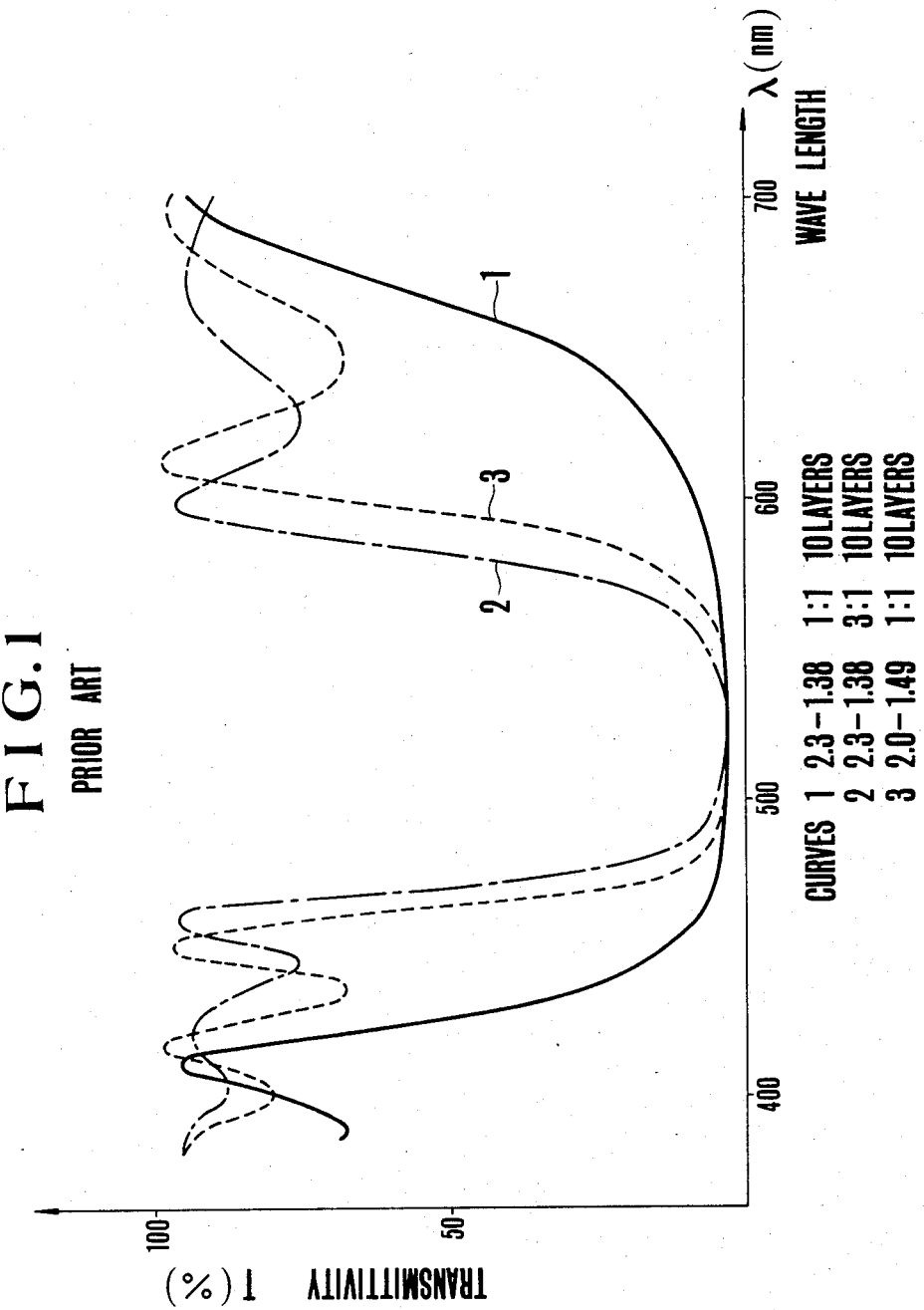
FIG. 1 is a diagram showing properties of transmittivity of a conventional dichroic mirror.
Figure 2:
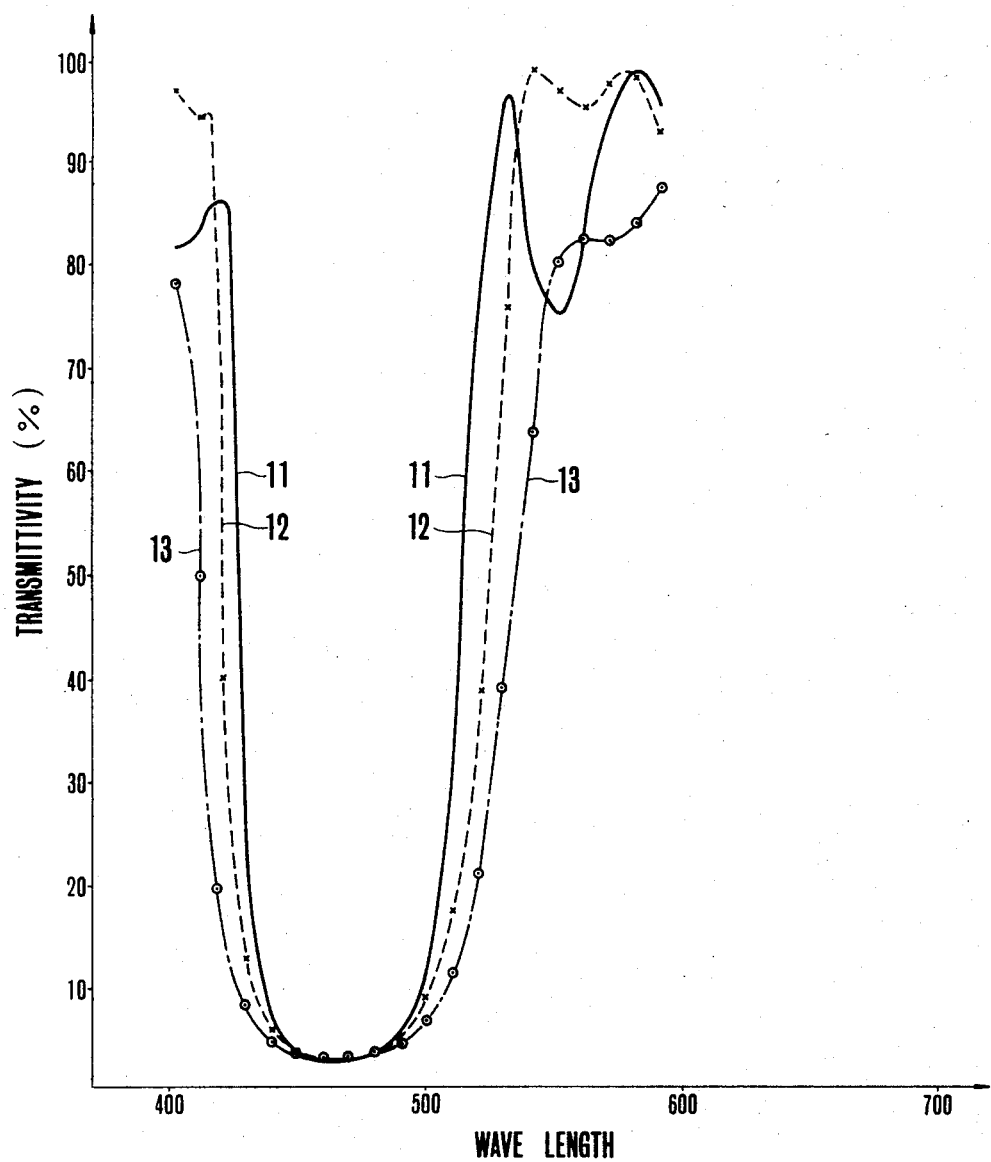
FIG. 2 is a diagram showing properties of transmittivity of a blue-reflecting dichroic mirror for explaining the present invention.

FIG. 2 shows curves of transmittivities of a blue-reflecting dichroic mirror for explaining the present invention. The ordinate represents transmittivity (%), while the abscissa represents wave length (mμ). The transmittivity curves (11, 12, 13) in FIG. 2 show the properties of a ten-layer blue-reflecting dichroic mirror composed of alternate low refractive index layers with a refractive index of 1.38 and high refractive index layers with a refractive index of 2.2 on a substrate (BK7). In FIG. 2 the reference wave length is 480 mμ and luminous flux impinges into the dichroic mirror at an angle of 27.5° from the substrate. Data of a dichroic mirror corresponding to the transmittivity curves (11, 12, 13) shown in FIG. 2 are shown in Table 2.

FIGS. 2A, 2B, and 2C show partial sections of three mirrors having the characteristics of respective curves 11, 12, and 13, and constructed of layers 10, dimensioned according to Table 2, under respective curves 11, 12, and 13. Each layer 10 is identified as L to indicate the aforementioned low refractive index 1.38 or H to indicate the aforementioned high refractive index 2.2. The layers 10 are supported on the substrate BK 7.

TABLE 2

| | Reference wave length λo = 480mμ | | |
|---|---|---|---|
| | Curve 11 | Curve 12 | Curve 13 |
| Substrate (BK7) | | | |
| 1st layer (1.38) | 120 mμ | 120 mμ | 120 mμ |
| 2nd layer (2.2) | 360 | 360 | 360 |
| 3rd layer (1.38) | 120 | 120 | 120 |
| 4th layer (2.2) | 360 | 360 | 360 |
| 5th layer (1.38) | 120 | 120 | 120 |
| 6th layer (2.2) | 360 | 120 | 120 |
| 7th layer (1.38) | 120 | 120 | 120 |
| 8th layer (2.2) | 360 | 360 | 120 |
| 9th layer (1.38) | 120 | 120 | 120 |
| 10th layer (2.2) | 360 | 360 | 360 |
| air (1.0) | | | |
| Half band width | 86 | 106 | 125 |

The dichroic mirror of curve 11 merely has an arrangement of optical film thickness ratio of 3:1, in which an optical film thickness of a high refractive index layer is $\frac{3}{4}\lambda o$, and an optical film thickness of a low refractive index layer is $\frac{1}{4}\lambda o$. The half band width of the curve 11 is about 86 mμ and sufficient half band width can not be obtained in this kind of structure. In the optical curve 12, a film thickness of the 6th high refractive index layer counted from the substrate, out of the structure of a dichroic mirror corresponding to the curve 11, is changed from 360 mμ to 120 mμ. Only one of the high refractive index layers has an optical film thickness of $\mu o/4$. In such a dichroic mirror. The half band width becomes 106 mμ, larger than that in the curve 11. In the curve 13, the optical film thickness of the 8th high refractive index layer from the substrate in the mirror structure of curve 12, is further converted from 360 mμ to 120 mμ.

Therefore, 2 layers with an optical film thickness of $\lambda o/4$ and 3 layers with the thickness of $\frac{3}{4}\lambda o$ are mixed into the hight refractive index layers. In such structure, the half band width becomes 125 mμ, thus the half band width can be made about 1.5 times larger than that when merely high refractive index layers of $\frac{3}{4}\lambda o$ and low refractive index layers of $\frac{1}{4}\lambda o$ are used.

Figure 3:
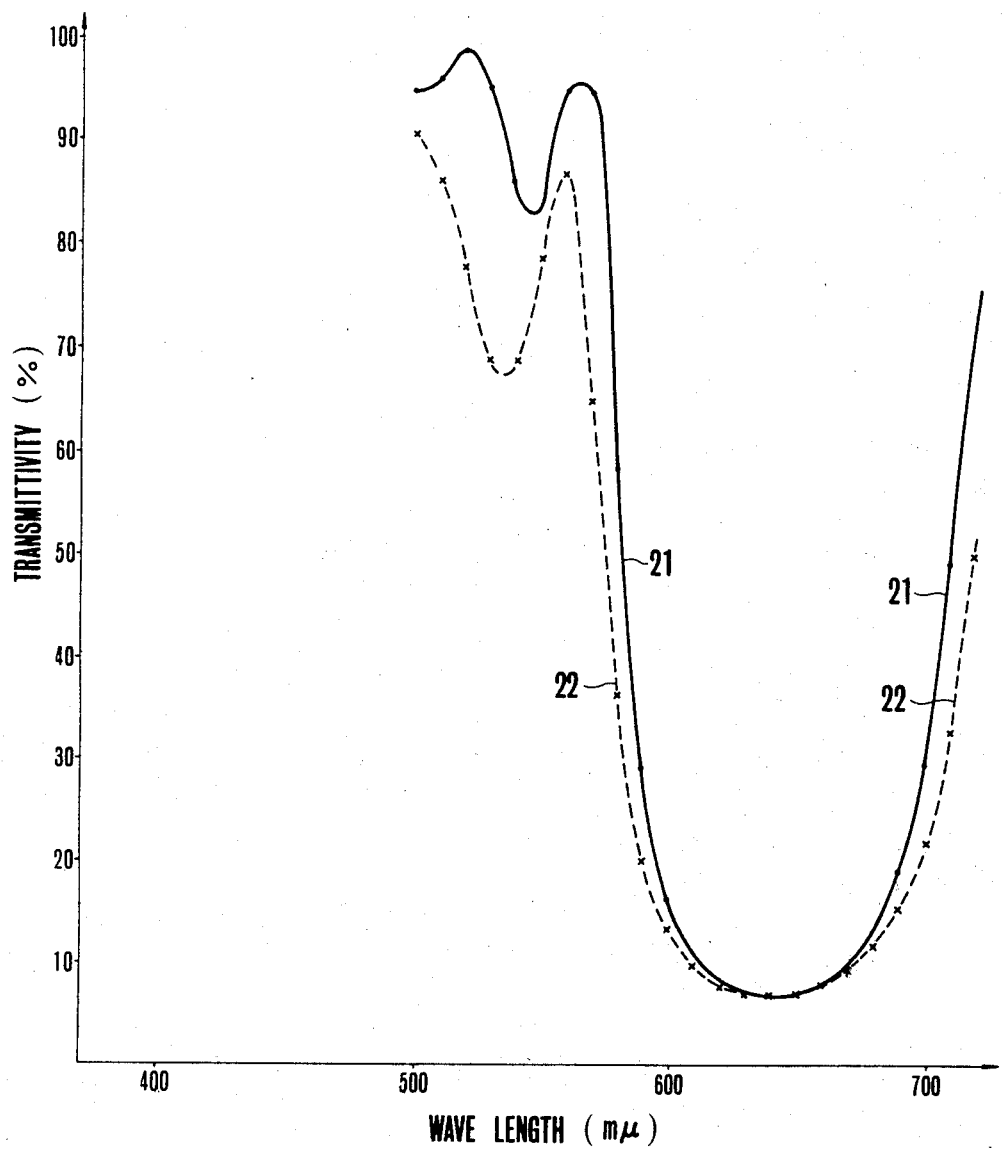
FIG. 3 is a diagram showing properties of transmittivity of a red-reflecting dichroic mirror for explaining the present invention.

FIG. 3 shows transmittivity curves of an example of a red reflecting dichroic mirror embodying the present invention. A dichroic film corresponding to the properties curves (21, 22) shown by curves 21 and 22 in FIG. 3 has a 10 layer arrangement composing of alternate high refractive index layers with a refractive index of 2.2 and low refractive index layers with a refractive index of 1.38 laid up on a substrate (BK7). The layer contacting the substrate is a high refractive index layer. The reference wave length λo is 660 mμ and the properties shown in FIG. 3 are those when luminous flux impinges with an angle of 27.5° to substrate. The mirror structure corresponding to the properties curves (21, 22) shown in FIG. 3 is shown in Table 3.

TABLE 3

| | Reference wave length λo = 660 mμ | |
|---|---|---|
| | Curve 21 | Curve 22 |
| Substrate (BK7) | | |
| 1st layer (2.2) | 495 mμ | 495 mμ |
| 2nd layer (1.38) | 165 | 165 |
| 3rd layer (2.2) | 495 | 495 |
| 4th layer (1.38) | 165 | 165 |

TABLE 3-continued

| Reference wave length λo = 660 mμ | | |
|---|---|---|
| | Curve 21 | Curve 22 |
| 5th layer (2.2) | 495 | 495 |
| 6th layer (1.38) | 165 | 165 |
| 7th layer (2.2) | 495 | 165 |
| 8th layer (1.38) | 165 | 165 |
| 9th layer (2.2) | 495 | 495 |
| 10th layer (1.38) | 165 | 165 |
| Air (1.0) | | |
| Half band width | 130 | 144 |

FIGS. 3A and 3B show partial sections of three mirrors constructed of layers 10 and dimensioned according to Table 3. The layers 10 of FIG. 3A have the dimensions shown under curve 21. The layers 10 of FIG. 3B have the thicknesses shown under curve 22. Each layer 10 is identified either as L, to indicate the aforementioned low refractive index 1.38, or H, to indicate the aforementioned high refractive index 2.2. The layers 10 are supported on the substrate BK 7.

As shown in Table 3, to structure of mirrors corresponding to the curve 21 is such that an optical film thickness of high refractive index layers (2.2) is ¾λo, while that of low refractive index layers (1.38) is ¼λo, and high refractive index layers and low refractive index layers are merely positioned in a proper order with a ratio of optical film thickness of 3:1. The half band width is 130 mμ.

The mirror structure whose properties correspond to the curve 22 is a such that the optical film thickness of the 7th high refractive index layer from the substrate is changed from 495 mμ to 165 mμ so that a layer of ¼λo is mixed in the high refractive index layers of ¾λo. This is different from the mirror structure corresponding to the curve 21. The half band width in such structure goes up to 144 mμ.

While a desired half band width can be obtained in the above example of the present invention, ripples are generated in the transmittance zone. Such ripples are effectively removed by somewhat shifting the optical film thicknesses from the optical basic film thickness ¾λo and ¼λo of the high refractive index layers and from the basic optical film thickness of ¼λo of the low refractive index layers. The following describes an example of a dichroic mirror with a 12 layer structure in which a desired half band width is obtained and ripples are satisfactorily removed according to the present example.

In this 12 layer arrangement which starts with a high refractive index layer from a substrate, the first, the fifth and the seventh layers as counted from the substrate are basic layers having a high refractive index with ¼λo film thickness (in which λo is a reference wave length as explained above), while the third, the ninth and the eleventh layers are basic layers having a high refractive index with ¾λo optical film thickness and the other layers are basic layers having a low refractive index with ¼λo. An appropriate half band width can be obtained and ripples are satisfactorily readjusted. A transmittivity curve of the aforementioned dichroic mirror with 12 layers, in which a refractive index of high refractive index layers is 2.3 and that of low refractive index layers is 1.38, is shown by 31 in FIG. 4. FIG. 4 also shows a transmittivity curve 32 of a dichroic mirror with 12 layer structure consisting of alternate layers of high refractive index layers having a refractive index of 2.3 and an optical film thickness of ¾λo and low refractive index layers having an optical refractive index of 1.38 and a film thickness of ¼λo, wherein refractive indexes are same as those for the curve 31. The property curve 31 of the dichroic mirror with the above mentioned structure has its half band width enlarged to a desired size compared to that of the properties curve 32, but the ripples of the curve 31 drop considerably at the long wave length side. In a conventional method of removing ripples, the optical film thicknesses of the first, second and last layer as counted from a substrate are made as non-integer films.

However, even if a conventional method for removing ripples is applied to a dichroic plane, which has high refractive index layers with an optical film thickness of ¼λo and high refractive index layers with an optical film thickness of ¾λo are mixedly provided as basic layers as mentioned above, transmittivity properties can not be effectively improved.

In the present invention, at least one of the intermediate layers is made as a non-integer layer beside providing a conventional ripple prevention method, wherein in the above mentioned blue reflecting dichroic plane with 12 layers, the 6th low refractive index layer with an optical film thickness of ¼λo is made as an adjusting layer. Table 4 shows a dichroic mirror consisting of TiO₂ with a high refractive index and MgF₂ with a low refractive index as an example of a dichroic mirror with the above mentioned 12 layer structure. Here the optical film thickness of the first, second and last layers from the substrate are shifted from the optical film thicknesses of the above mentioned basic layers. Here, a dispersion formula, $n=2.12+40/(\lambda-298)$ obtained from experimentation value is used for the refractive index of TiO₂, and a value of 1.38 is used for the refractive index of MgF₂.

TABLE 4

| Layer Number | Optical Film thickness (nm) | Refractive index |
|---|---|---|
| BK 7 | | |
| 1 | 339 | H(TiO₂) |
| 2 | 87 | L (MgF₂) |
| 3 | 370 | H |
| 4 | 123 | L |
| 5 | 139 | H |
| 6 | variable | L |
| 7 | 123 | H |
| 8 | 123 | L |
| 9 | 370 | H |
| 10 | 123 | L |
| 11 | 370 | H |
| 12 | 218 | L |
| Air | | |

TABLE 5

| Layer Number | Optical Film thickness (mm) | Refractive index |
|---|---|---|
| BK 7 | | |
| 1 | 339 | H(TiO₂) |
| 2 | 87 | L(MgF₂) |
| 3 | 370 | H |
| 4 | 123 | L |
| 5 | 139 | H |
| 6 | 54 | L |
| 7 | 123 | H |
| 8 | 123 | L |
| 9 | 370 | H |
| 10 | 123 | L |
| 11 | 370 | H |
| 12 | 218 | L |

TABLE 5-continued

| Layer Number | Optical Film thick- nexx (mm) | Refractive index |
|---|---|---|
| Air | | |

Figure 4A:
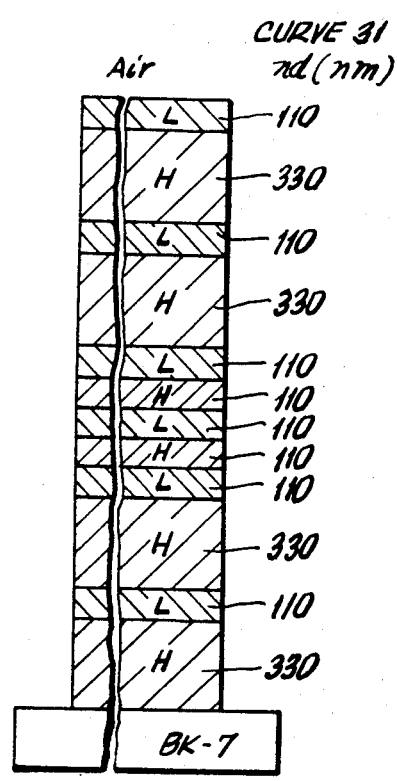
FIGS. 4A and 4B are partial sections of mirrors embodying features of the invention and having the properties shown in FIG. 4.
Figure 4B:
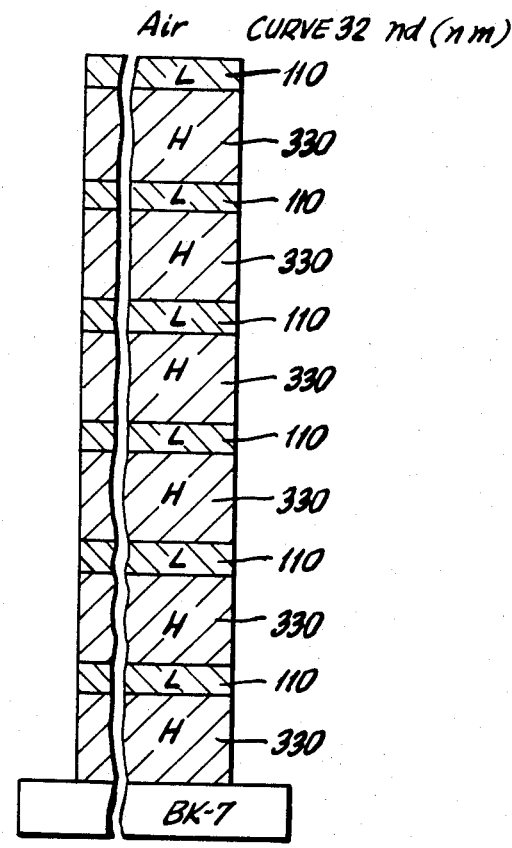
Figure 5A:
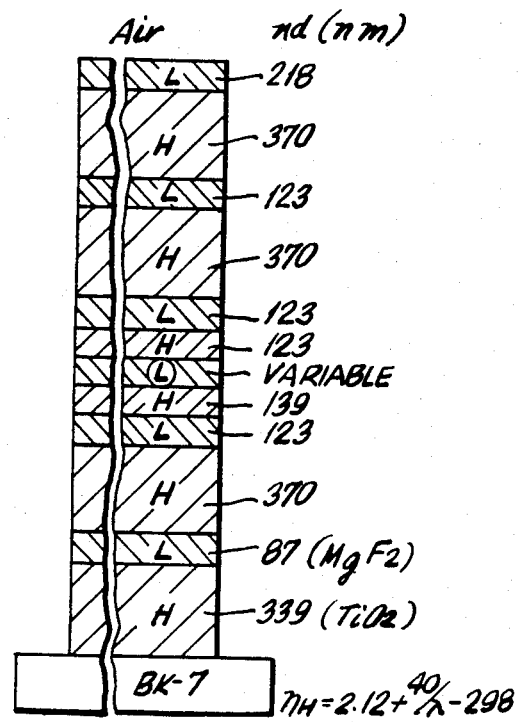
FIG. 5A is a partial section of a mirror having the properties shown in FIG. 5 and embodying features of the invention.

FIGS. 4A and 5A show partial sections of two mirrors constructed of layers 10, dimensioned according to Tables 4 and 5 respectively. Here again, as in the other drawings showing mirrors, each layer 10 is identified as either L or H, to indicate the lower or higher refractive index. As in all the drawings of dichroic mirrors, each is supported on a substrate BK 7.

FIG. 5 shows changes in transmittivity, when the optical film thickness of the 6th layer is varied, for wave length of 520 nm curve (41), 560 nm curve (42), 600 nm curve (43), 640 nm curve (44) and 680 nm curve (45).

Figure 6A:
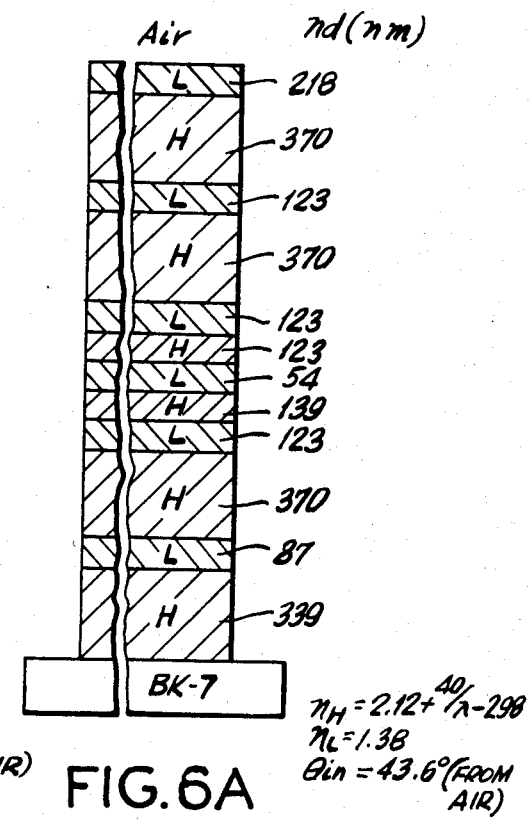

Therefore, abscissa in FIG. 5 shows the optical film thickness of the 6th layer and ordinates thereof shows the transmittivity in each wave length. As shown in FIG. 5, when the optical film thickness of the 6th layer is made about $\frac{1}{8}$ (54 nm) of a reference wave length (about 492 nm), the transmittivity at each wave length is improved. The data at such a time are shown in Table 5 and a transmittivity properties curve at that time is shown in FIG. 6. As shown in FIG. 6, ripples are satisfactorily corrected in a transmitting zone, and the effect of enlarging the half band width, which is obtained by mixing high refractive index films with $\frac{1}{4}\lambda o$ thickness and high refractive index films with $\frac{3}{4}\lambda o$, is not lost.

As has been explained above, in a blue-reflecting dichroic mirror with 12-layer structure which starts with a high refractive index layer as counted from the substrate, when the reference wave length is represented by $\lambda o$, and the optical film thickness of the 1st layer as counted from the substrate is represented by D1, the optical film thickness of the 2nd layer by D2, the optical film thickness of the 5th layer by D5, the optical film thickness of 6th layer by D6, the optical film thickness of 12th layer by D12, a dichroic mirror having satisfactory transmittivity can be obtained, if the D1, D2, D5, D6 and D12 fall within the following limitations:

$0.85 \times \frac{3}{4}\lambda o \leq D1 \leq 0.95 \times \frac{3}{4}\lambda o$ $0.7 \times \frac{1}{4}\lambda o \leq D2 \leq 0.85 \times \frac{1}{4}\lambda o$ $1.0 \times \frac{1}{4}\lambda o \leq D5 \leq 1.5 \times \frac{1}{4}\lambda o$ $0.4 \times \frac{1}{4}\lambda o \leq D6 \leq 0.8 \times \frac{1}{4}\lambda o$ $1.6 \times \frac{1}{4}\lambda o \leq D12 \leq 1.9 \times \frac{1}{4}\lambda o$ FIG. 7 and FIG. 8 show curves for properties of transmittivity in other examples of the above mentioned dichroic mirror with 12-layer structure, and data for the dichroic mirrors shown in FIG. 7 and FIG. 8 are shown in Table 6.

TABLE 6

| | Curves for properties of transmittivity shown in FIG. 7 | | Curves for properties of transmittivity shown in FIG. 8 | |
|---|---|---|---|---|
| | Refractive index | Optical film thickness | Refractive index | Optical film thickness |
| Substrate | BK 7 | | BK 7 | |
| 1st layer | H | $350^{nm}\ 0.95 \times \frac{3}{4}\lambda o$ | H | $315^{nm}\ 0.85 \times \frac{3}{4}\lambda o$ |
| 2nd layer | 1.38 | $87\ 0.7 \times \frac{1}{4}\lambda o$ | 1.49 | $98\ 0.8 \times \frac{1}{4}\lambda o$ |
| 3rd layer | H | $369\ 3.0 \times \frac{1}{4}\lambda o$ | H | $369\ 3.0 \times \frac{1}{4}\lambda o$ |
| 4th layer | 1.38 | $123\ 1.0 \times \frac{1}{4}\lambda o$ | 1.49 | $123\ 1.0 \times \frac{1}{4}\lambda o$ |
| 5th layer | H | $184\ 1.5 \times \frac{1}{4}\lambda o$ | H | $123\ 1.0 \times \frac{1}{4}\lambda o$ |
| 6th layer | 1.38 | $50\ 0.4 \times \frac{1}{4}\lambda o$ | 1.49 | $62\ 0.5 \times \frac{1}{4}\lambda o$ |
| 7th layer | H | $123\ 1.0 \times \frac{1}{4}\lambda o$ | H | $123\ 1.0 \times \frac{1}{4}\lambda o$ |
| 8th layer | 1.38 | $123\ 1.0 \times \frac{1}{4}\lambda o$ | 1.49 | $123\ 1.0 \times \frac{1}{4}\lambda o$ |
| 9th layer | H | $369\ 3.0 \times \frac{1}{4}\lambda o$ | H | $369\ 3.0 \times \frac{1}{4}\lambda o$ |
| 10th layer | 1.38 | $123\ 1.0 \times \frac{1}{4}\lambda o$ | 1.49 | $123\ 1.0 \times \frac{1}{4}\lambda o$ |
| 11th layer | H | $369\ 3.0 \times \frac{1}{4}\lambda o$ | H | $369\ 3.0 \times \frac{1}{4}\lambda o$ |
| 12th layer | 1.38 | $234\ 1.9 \times \frac{1}{4}\lambda o$ | 1.49 | $197\ 1.6 \times \frac{1}{4}\lambda o$ |
| Air | | | | |

FIGS. 7A and 8A show partial sections of two mirrors constructed of layers 10, dimensioned according to the respective curves of FIG. 7 and FIG. 8 in Table 6. As in previous figures showing mirrors, the layers 10 are identified as L or H, and are supported on a substrate BK 7.

In the Table 6, the refractive index H satisfies equation, $H = 2.12 + (40/\lambda - 298)$, and $\lambda$ represents a wave length, further $\lambda o$ represents the reference wave length which is 492 nm. Also, the angle of incidence of light rays into the dichroic mirror from air is 43.6°.

Ripples in a blue-reflecting dichroic mirror with a 14-layer structure are effectively removed, when thicknesses of basic optical films of the high refractive index layers at the 1st, 3rd, 5th, 7th and 13th layers as counted from the substrate are $\frac{1}{4}\lambda o$ (in which $\lambda o$ represents the reference wave length), and thickness of basic optical films of the high refractive index layers at the 9th and 11th layers are $\frac{3}{4}\lambda o$, while the other layers are low refractive index layers and the thicknesses of their basic optical films are $\frac{1}{4}\lambda o$. A dichroic mirror having such a structure, in which TiO$_2$ is used in the high refractive index layers and SiO$_2$ with a refractive index of 1.49 is used in the low refractive index layers is shown in Table 7. A curve for transmittivity of the dichroic plane is shown in FIG. 9. Ripples at the long wave length are controlled by varying the optical film thicknesses from the above mentioned basic optical film thicknesses at the 1st layer, 2nd layer and the last layer as counted from the substrate and at the 5th, 6th and at the 13th layers which are among intermediate layers, as shown in the Table 7. Control of ripples are particularly enhancend by reducing the optical film thickness of the low refractive index layer at the 6th layer to a level as thin as about $\frac{1}{8}$ of the reference wave length (about 492 mm).

mirrors shown in FIG. 10 and FIG. 11 are shown in Table 8.

TABLE 8

| | Curve for properties of transmittivity shown in FIG. 10 | | Curve for properties of transmittivity shown in FIG. 11 | |
|---|---|---|---|---|
| | Refractive index | Optical film thickness | Refractive index | Optical film thickness |
| Substrate | BK7 | | | |
| 1st layer | H | 110$^{nm}$ 0.9 × ¼λo | H | 74$^{nm}$ 0.6 × ¼λo |
| 2nd layer | 1.49 | 44 0.35 × ¼λo | 1.49 | 92 0.75 × ¼λo |
| 3rd layer | H | 123 1.0 × ¼λo | H | 123 1.0 × ¼λo |
| 4th layer | 1.49 | 123 1.0 × ¼λo | 1.49 | 123 1.0 × ¼λo |
| 5th layer | H | 111 0.9 × ¼λo | H | 123 1.0 × ¼λo |
| 6th layer | 1.49 | 86 0.7 × ¼λo | 1.49 | 62 0.5 × ¼λo |
| 7th layer | H | 123 1.0 × ¼λo | H | 123 1.0 × ¼λo |
| 8th layer | 1.49 | 123 1.0 × ¼λo | 1.49 | 123 1.0 × ¼λo |
| 9th layer | H | 369 3.0 × ¼λo | H | 369 3.0 × ¼λo |
| 10th layer | 1.49 | 123 1.0 × ¼λo | 1.49 | 123 1.0 × ¼λo |
| 11th layer | H | 3.0 × ¼λo | H | 369 3.0 × ¼λo |
| 12th layer | 1.49 | 123 1.0 ×¼λo | 1.49 | 123 1.0 × ¼λo |
| 13th layer | H | 86 0.7 × ¼λo | H | 62 0.5 × ¼λo |
| 14th layer | 1.49 | 197 1.6 × ¼λo | 1.49 | 233 1.9 × ¼λ0 |
| Air | | | | |

TABLE 7

| Layer Number | Optical Thickness of Film (nm) | Refractive index |
|---|---|---|
| BK 7 | | |
| 1 | 76 | H (TiO$_2$) |
| 2 | 92 | L (SiO$_2$) |
| 3 | 123 | H |
| 4 | 123 | L |
| 5 | 112 | H |
| 6 | 86 | L |
| 7 | 123 | H |
| 8 | 123 | L |
| 9 | 369 | H |
| 10 | 123 | L |
| 11 | 369 | H |
| 12 | 123 | L |
| 13 | 75 | H |
| 14 | 210 | L |
| Air | | |

FIG. 9 shows a partial section of a mirror constructed of layers 10, dimensioned according to Table 7.

Also, satisfactory properties of transmittivity can be obtained in a blue-reflecting dichroic mirror starting with a high refractive index layer from the aforementioned substrate, when the reference wave length is represented by λo, and the optical film thickness of the 1st layer as counted from the substrate is represented by D1, the optical film thickness at the 2nd layer by D2, the film thickness at the 5th layer by D5, the optical film thickness at the 6th layer by D6, the optical film thickness at the 13th layer by D13, and the optical film thickness at the 14th layer by D14, and if D1, D2, D5, D6, D13 and D14 fall within the following limitations:

0.6 × ¼λo ≦ D1 ≦ 0.9 × ¼λo 0.35 × ¼λo ≦ D2 ≦ 0.75 × ¼λo 0.9 × ¼λo ≦ D5 ≦ 1.0 × ¼λo 0.4 × ¼λo ≦ D6 ≦ 0.8 × ¼λo 0.5 × ¼λo ≦ D13 ≦ 0.7 × ¼λo 1.6 × ¼λo ≦ D14 ≦ 1.9 × ¼λo

FIG. 10 and FIG. 11 are diagrams of curves for transmittivity in examples of the aforementioned dichroic mirrors with 14-layer structures. The of the dichroic FIGS. 10A and 11A are partial sections of two mirrors constructed of layers 10, dimensioned according to Table 8. FIG. 10A corresponds to the curve for properties of transmittivity shown in FIG. 10. FIG. 11A corresponds to the curve for properties of transmittivity shown in FIG. 11.

In the Table 8, the refractive index H satisfies an equation, H = 2.12 + 40/(λ − 298), and λ represents the wave length, also λo represents the reference wave length which is 492 nm. Also the angle of incidence of incident rays into the dichroic mirror from air is 43.6°.

What is claimed is:

1. A dichroic mirror comprising at least ten layers said layers being alternate high refractive index layers and low refractive index layers, for a designed wave length λo a plurality of the high refractive index layers having optical film thicknesses of ¼λo and ¾λo, and a plurality of the low refractive index layers having optical film thicknesses of ¼λO.

2. A dichroic mirror comprising at least ten layers, said layers being alternate high refractive index layers and low refractive index layers, for an optical designed wave length λo and basic optical film thicknesses for the high refractive index layers of ¼λo and ¾λo, and a basic optical film thickness for the low refractive index layers of ¼λo, and first, second and last layers as counted from a substrate and one layer of the other intermediate layers being shifted from the basic film thicknesses, and the remaining layers having the basic thicknesses.

3. A dichroic mirror according to claim 2, in which the dichroic mirror is a blue-reflecting dichroic mirror with 12 layers structure, wherein;
the first, the fifth and the seventh layers as counted from the substrate are high refractive index layers which have basic optical films with a film thickness of ¼λo; and
the third, the ninth and the eleventh layers as counted from the substrate are high refractive index layers which have basic optical film with film thickness of ¾λo; further,
the second, the fourth, the sixth, the eighth, the tenth and the twelveth layers as counted from the substrate are low refractive index layers which have basic optical films with a film thickness of ¼λo.

4. A dichroic mirror according to claim 3, in which an intermediate layer, having its optical film thickness changed from the basic optical film thickness, is the sixth layer.

5. A blue-refracting dichroic mirror comprising:
alternate layers of high refractive index layers and low refractive index layers and a total of 12 layers and a substrate, starting with a high refractive index layer from the substrate; for a reference wave length $\lambda o$,
the basic optical film thicknesses of the high refractive index layers being $\frac{1}{4}\lambda o$ and $\frac{3}{4}\lambda o$;
a basic optical film thickness of the low refractive index layers being $\frac{1}{4}\lambda o$; and
when an optical film thickness of an i-th layer counted from the substrate is represented by Di, the optical film thicknesses of the first, the second, the fifth, the sixth and the twelfth layers as counted from the substrate being different from the basic optical film thicknesses, and thicknesses D1, D2, D5, D6 and D12 satisfying the following formulae:

$$0.85 \times \tfrac{1}{4}\lambda o \leq D1 \leq 0.95 \times \tfrac{1}{4}\lambda o$$

$$0.7 \times \tfrac{1}{4}\lambda o \leq D2 \leq 0.85 \times \tfrac{1}{4}\lambda o$$

$$1.0 \times \tfrac{1}{4}\lambda o \leq D5 \leq 1.5 \times \tfrac{1}{4}\lambda o$$

$$1.4 \times \theta\lambda o \leq D6 \leq 0.8 \times \tfrac{1}{4}\lambda o$$

$$1.6 \times \tfrac{1}{4}\lambda o \leq D12 \leq 1.9 \times \tfrac{1}{4}\lambda o.$$

6. A blue-reflecting dichroic mirror comprising:
alternate high refractive index layers and low refractive index layers totaling 14 layers and a substrate, a high refractive index layer being adjacent the substrate, for a reference wave length $\lambda o$,
basic optical film thicknesses of the high refractive index layers being $\frac{1}{4}\lambda o$ and $\frac{3}{4}\lambda O$;
a basic optical film thickness of the low refractive index layer being $\frac{1}{4}\lambda o$; and
when an optical film thickness of an i-th layer counted from the substrate is represented by Di, the optical film thicknesses of the first, the second, the fifth, the sixth, the thirteenth and the fourteenth layers as counted from the substrate being shifted from the above mentioned basic optical film thicknesses, and thicknesses, D1, D2, D5, D6, D13 and D14 satisfying the following formulae:

$$0.6 \times \tfrac{1}{4}\lambda o \leq D1 \leq 0.9 \times \tfrac{1}{4}\lambda o$$

$$0.35 \times \tfrac{1}{4}\lambda o \leq D2 \leq 0.75 \times \tfrac{1}{4}\lambda o$$

$$0.9 \times \tfrac{1}{4}\lambda o \leq D5 \leq 1.0 \times \tfrac{1}{4}\lambda o$$

$$0.4 \times \tfrac{1}{4}\lambda o \leq D6 \leq 0.8 \times \tfrac{1}{4}\lambda o$$

$$0.5 \times \tfrac{1}{4}\lambda o \leq D13 \leq 0.7 \times \tfrac{1}{4}\lambda o$$

$$0.6 \times \tfrac{1}{4}\lambda o \leq D14 \leq 1.9 \times \tfrac{1}{4}\lambda o.$$

* * * * *